US007068670B2

(12) United States Patent
Gancarcik et al.

(10) Patent No.: US 7,068,670 B2
(45) Date of Patent: Jun. 27, 2006

(54) TRANSPORT PROTOCOLS FOR APPLICATION PLATFORMS OVER NETWORK PORTALS

(75) Inventors: Ed Gancarcik, Ottawa (CA); David Ross, Nepean (CA); Jean-Marc Seguin, Stittsville (CA); Alain Chamsi, Ottawa (CA)

(73) Assignee: Mitel Networks Corporation (CA)

( * ) Notice: Subject to any disclaimer, the term of this patent is extended or adjusted under 35 U.S.C. 154(b) by 936 days.

(21) Appl. No.: 10/056,404

(22) Filed: Jan. 25, 2002

(65) Prior Publication Data

US 2002/0101861 A1    Aug. 1, 2002

(30) Foreign Application Priority Data

Jan. 27, 2001    (GB)    ................................... 0102138

(51) Int. Cl.
    *H04L 12/28* (2006.01)
(52) U.S. Cl. ........................................ 370/401; 370/356
(58) Field of Classification Search ........ 370/352–358, 370/386, 389, 395.52, 395.53, 395.6, 396.61, 370/471, 474, 401, 402, 465, 493–495; 709/311
    See application file for complete search history.

(56) References Cited

U.S. PATENT DOCUMENTS 5,208,911 A    5/1993    Newman et al.

| 5,659,542 A | * | 8/1997 | Bell et al. ................... 370/496 |
| 5,987,519 A | * | 11/1999 | Peifer et al. ................ 709/230 |

FOREIGN PATENT DOCUMENTS

| CA | 2149480 | 2/1996 |
| EP | 0560706 | 9/1993 |
| EP | 0666670 | 12/1994 |

(Continued)

OTHER PUBLICATIONS

Doeringer W., et al., "Access Architecture for a Multiprotocol Boardband Backbone", Computer Networks and ISDN Systems, North Holland Publishing, Amsterdam, NL., vol. 29, No. 2, 1997, pp. 137-155.

(Continued)

*Primary Examiner*—Brenda Pham
(74) *Attorney, Agent, or Firm*—Jones Day

(57) ABSTRACT

The present invention is directed at hybrid network configuration, comprising a plurality of application platforms for sending and receiving at least one of voice and data in accordance with a first predetermined protocol, a voice/data network for routing the voice and data between the plurality of application platforms in accordance with a second predetermined protocol, and at least one network portal for providing the plurality of application platforms access to the voice/data network using the first and second predetermined protocols.

10 Claims, 3 Drawing Sheets

FOREIGN PATENT DOCUMENTS

| | | |
|---|---|---|
| EP | 0705012 | 4/1996 |
| EP | 0705012 | 3/2000 |
| GB | 2308904 | 7/1997 |
| GB | 2352146 | 1/2001 |
| JP | 11205370 | 7/1999 |
| WO | 9701940 | 1/1997 |
| WO | WO 97/29581 | 8/1997 |
| WO | WO 99/14882 | 3/1999 |
| WO | 9933226 | 7/1999 |
| WO | WO 99/49677 | 9/1999 |
| WO | 0074409 | 12/2000 |
| WO | WO 02/11389 | 2/2002 |

OTHER PUBLICATIONS

Hawe, B., et al., "Transparent Interconnection of Local Area Networks with Bridges", Journal of Telecommunication, Networks Computer Science Press, Inc., Maryland, U.S., vol. 3, No. 2, 1984, pp. 116-130.

Valko, A.G. et al., "Voice QOS In Third-Generation Mobile Systems", IEEE Inc., New York, U.S. vol. 17, No. 1, Jan. 1999, pp. 109-123.

F. Halsall "Data Communications, Computer Networks and Open Systems" published 1995, Addison-Wesley, pp. 483-495.

* cited by examiner

TRANSPORT PROTOCOLS FOR APPLICATION PLATFORMS OVER NETWORK PORTALS

FIELD OF THE INVENTION

The present invention relates in general to computer telephony integration (CTI) and more specifically to communications protocols for use by a mix of voice and data devices over a hybrid network.

BACKGROUND OF THE INVENTION

Currently, telephony and data networks terminate with a either a voice or data terminal, respectively. For example, the conventional terminal in the telephony paradigm is a telephone whereas in the data network paradigm the conventional terminal is a PC or laptop computer. Therefore, separate protocols have been developed for each network/termination pair. With the development of hybrid networks, standard inter-compatible protocols are required so that diverse voice and data devices can communicate efficiently with each other.

SUMMARY OF THE INVENTION

According to the present invention, a communication protocol is provided whereby a diverse collection of voice and data devices may communicate with each other without complicated protocol conversions as exist in the prior art. More specifically, a protocol mechanism is provided for establishing communications between an application platform and a network portal, on the one hand, and between the network portal and a voice/data network, on the other hand. The protocol mechanism includes a physical layer which is common to the application platform and the network portal, on the one hand, and common to the network portal and the voice/data network, on the other hand. A data layer is provided which communicates between the physical layer and the associated application platform, network portal, or voice/data network. According to an important aspect of the invention, the data layer encapsulates the information to be communicated with header information for routing of the information.

BRIEF DESCRIPTION OF THE DETAILED DRAWINGS

A description of the prior art and of embodiments of the present invention will now be described with reference to the accompanying drawings in which.

DETAILED DESCRIPTION OF PREFERRED EMBODIMENTS

Figure 1:
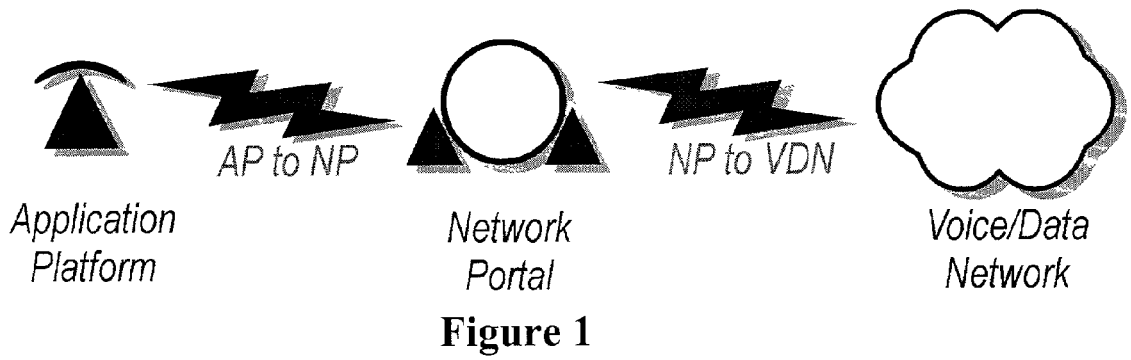
FIG. 1 is a schematic representation of a voice/data hybrid infrastructure in accordance with the prior art.

FIG. 1 is a simplistic diagram of the hardware infrastructure for a voice/data hybrid network. An application platform, or AP, represents any device that can send and receive voice or data, or a mixture of both, between other AP devices through a network portal within a voice/data network. In other words, an application platform (AP) is any device used as a terminating device on the hybrid network. Examples of application platforms include telephones, cellular phones, wireless communication devices, PDAs, computers, terminals, laptops, etc. A network portal, or NP, is a device that acts as a common gateway to the voice/data network for application platforms. Examples of network portals include any AP as set forth above that is configured to act as a NP, wireless receivers/transmitters (base stations), etc. The voice/data network itself is a system of voice or data (or a mixture of both) devices connected together for the purpose of transferring or routing voice/data information to other like devices. Examples of a voice/data network include a LAN, WAN, Internet, Intranet, PBX, Centrex, and Wireless Systems.

It is apparent from FIG. 1 that two protocol blocks are required. Once block defines communication between the application platform (AP) and the network portal (NP), and the second defines communication between the NP and the voice/data network.

Figure 2:
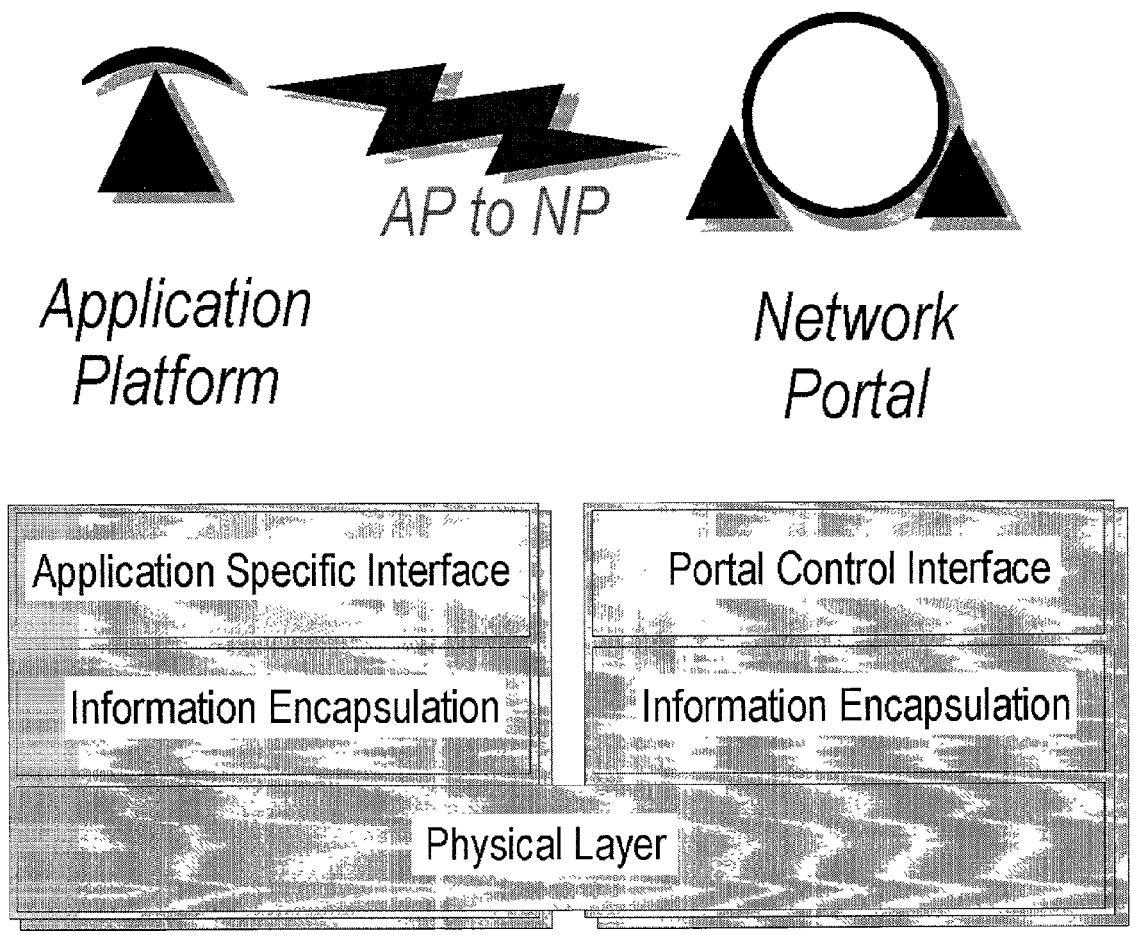
FIG. 2 is a block diagram showing a protocol according to a first embodiment for communications between an application platform and a network portal.

Turning now to FIG. 2, a high level representation is provided of the protocol blocks between the application platform and the network portal, in accordance with a first embodiment of the invention. The lowest layer, or physical layer, is common between both devices and is the mechanism by which information is passed. The physical layer can be a wired interface (serial, parallel, USB, POTS/telephony, etc . . . ) or a wireless interface (infrared/IrDA, radio, cellular, etc . . . ).

The next layer up, information encapsulation, performs two functions:

1. Takes information from the level above, packaging this information with a header containing necessary source/destination information and hands it over to the physical layer.
2. Takes information from the level below, removing the header containing necessary source/destination information and hands the information up to the higher level.

This level of abstraction allows for a more standard inter-compatible information exchange between devices than is provided for by the prior art.

The top layer is specific to the type of device it resides on. In the situation of an application platform device, the Application Specific Interface, or ASI, controls the formatting of information for use at the destination. The type of formatting is dependant on destination requirements (for example, voice information being passed from an Application Platform device for telephony (i.e. a POTS or IP telephone) is formatted for use by another telephony-compatible application platform device at the destination.

On the NP side of the diagram, a Network Portal Control Interface, or NPCI, determines whether or not the information can be processed internally or whether the data should be repackaged for use somewhere within the voice/data network using the NP to VDN protocol. By having this layer, a NP device is able to process any information which is pertinent to itself rather than always re-transmitting and waiting for another device to return it.

Figure 3:
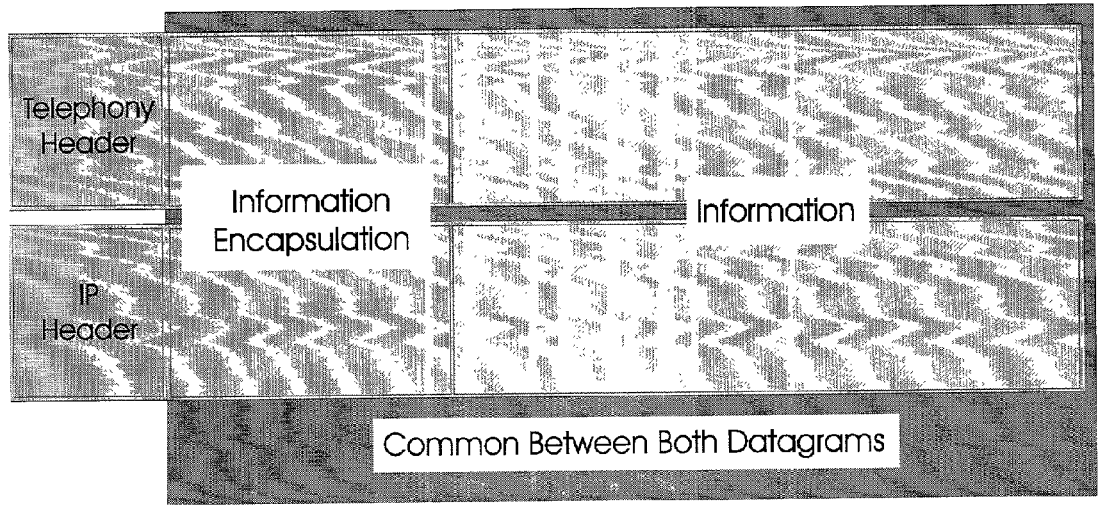
FIG. 3 is a datagram showing the structure of a packet of information exchanged between an application platform and network portal in accordance with the embodiment of FIG. 2.

FIG. 3 shows, in a simplified manner, how datagrams at the physical layer contain information targeted for voice or data networks. Voice or data information buried within the information encapsulation can travel over traditional telephony networks, or data networks using IP, without concern for the content. Once the NPCI has received the datagram, it decides, based on the content of the Information Encapsulation region, whether it should handle the information itself or repackage the data for use at some other destination.

Figure 4:
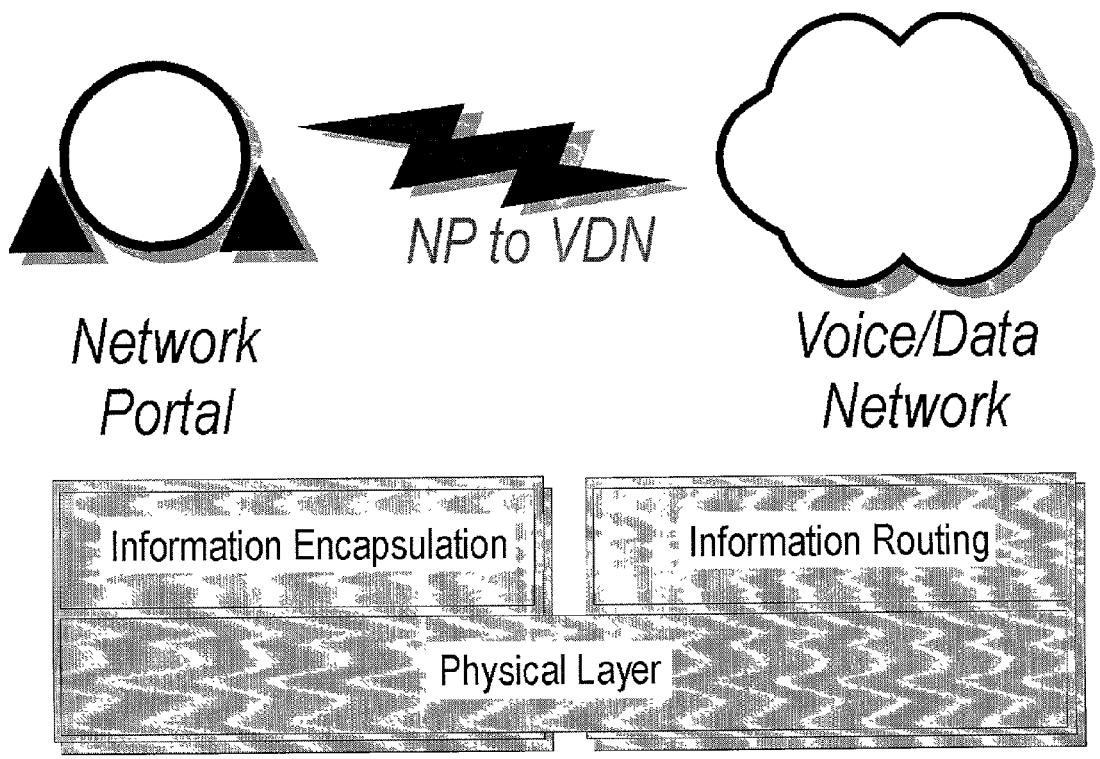
FIG. 4 is a block diagram showing a protocol according to a second embodiment for communications between a network portal and a voice/data network.

FIG. 4 shows a high level view of the protocol blocks between the network portal and the voice/data network. The lowest layer, physical layer, is common between both devices as this is the mechanism by which information is passed. As discussed above, the physical layer could be a wired or wireless interface.

The next layer up within the NP is the same as set forth above, namely information encapsulation. If the NP does not handle the information itself it must repackage the data for transmission across the voice/data network.

The information routing layer of the VDN takes the information package passed from the NP, encapsulates the data and passes this packet through its already defined network paths to the destination NP. From this point the process is reversed until an NP or IA handles the information.

The VDN that an NP communicates with can, for example, be another NP. Since the VDN is simply routing information, localized communications can eliminate the need for a VDN in some circumstances. By extension, since a NP can also contain the protocol for an AP, such a device could then be connected as AP to NP to AP only, further simplifying connectivity.

To summarize, an AP device communicates to another AP device through the NP by means of two protocol blocks; each block handling a specific task in passing this information to the destination. What must be noted in the implementation of these protocols is that a device may contain the protocols to allow it to act as an application platform while at the same time containing the protocols to allow it to act as a network portal. By making the lower protocol layers simple and generic, any device can be designed to fill each or both of these roles.

Figure 5:
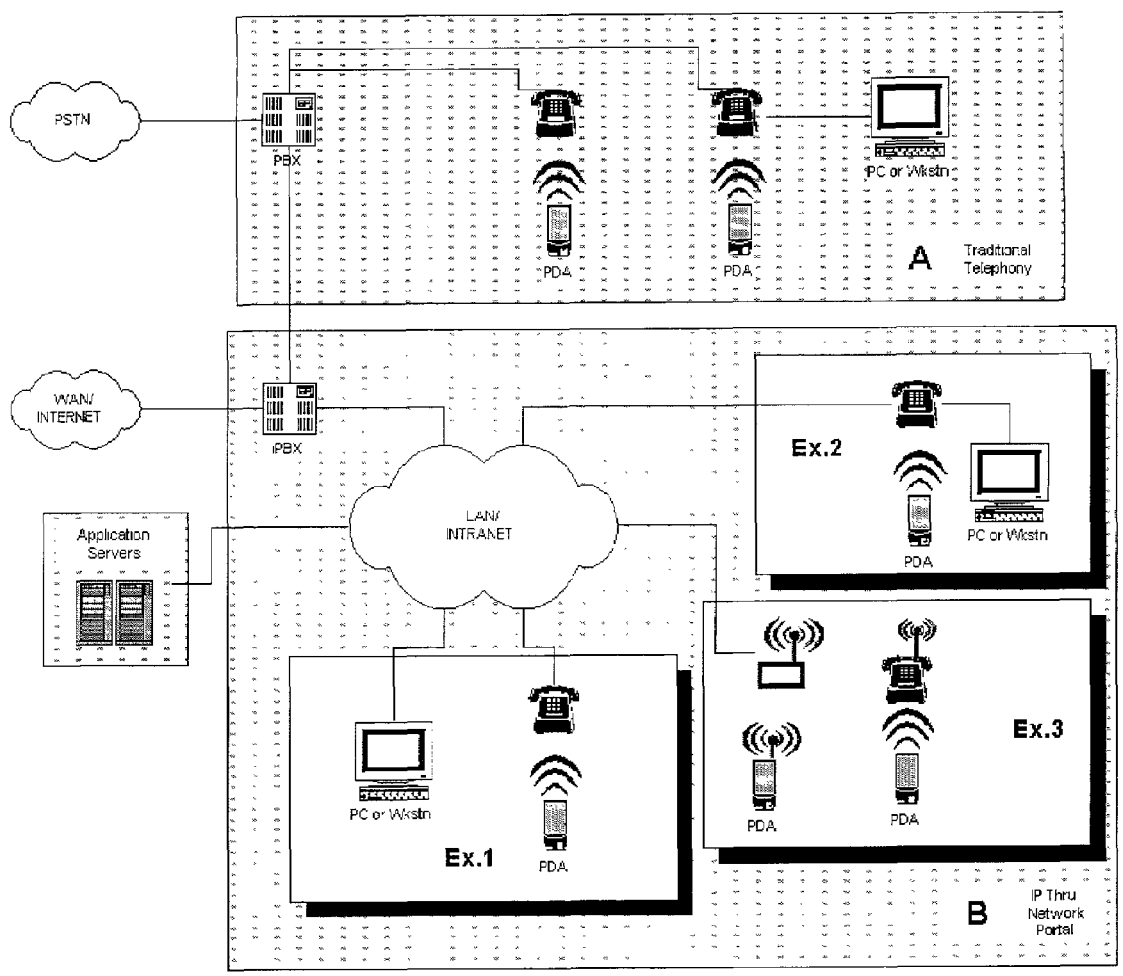
FIG. 5 is a block diagram showing PDA-enabled sets in traditional and hybrid networks configured for communication according to the protocol of the present invention.

FIG. 5 shows implementation of the protocol according to the invention within a hardware infrastructure for PDA-enabled sets in a traditional telephone network as well as in an IP network.

Region A of FIG. 5 shows a traditional telephony environment where the application platforms are shown as a PDA, a workstation, and a telephone. The telephone also acts as a network portal, for allowing the PC and PDA to communicate to the telephone itself as well as with other devices terminated elsewhere on the voice/data network. The PDA communicates in the preferred embodiment using infrared (IrDA) to the NP, which in turn can either handle the request or route it to the appropriate destination.

Region B of FIG. 5 shows how the AP devices can be implemented within a voice/data network based on IP. Three different examples are given. In Example 1, a PDA communicates to other devices on the network, including computers, phones and application servers, through an infrared link to a NP (an IP-based telephone). In Example 2, the computer is connected using Ethernet cable directly to the IP-based telephone using the telephone as its own NP. In Example 3, a wireless implementation allows an infrared PDA to communicate through the NP (the wireless telephone) to another NP (the wireless base station) while at the same time, a wireless PDA can communicate directly to the wireless base station.

It will be appreciated that, although embodiments of the invention have been described and illustrated in detail, various changes and modifications may be made. Firstly, a Bluetooth implementation on the PDA enabled set may include a wireless transceiver to the PDA, IP phone and other devices on the wireless desktop. IP access for the PDA is implemented in a manner similar to the method described above except that the call control command is imbedded in IP packets within the PDA & Bluetooth transceiver combination, instead of in the telephone set. The telephone set then acts as a network portal for all Bluetooth devices on the desktop. Another modification is that the PDA enabled telephone set may utilize the RS-232 communication protocol to support PDA applications such as Hot-Sync. Although this scenario is addressed by the Bluetooth wireless solution between the set and the PDA, the wired solution provides for faster development. All such changes and modifications may be made without departing from the sphere and scope of the invention as defined by the claims appended herein.

What is claimed is:

1. A hybrid network configuration, comprising:
   a plurality of application platforms for sending and receiving at least one of voice and data in accordance with a first predetermined protocol;
   a voice/data network for routing said voice and data between said plurality of application platforms in accordance with a second predetermined protocol; and
   at least one network portal for providing said plurality of application platforms access to said voice/data network by encapsulating said voice and data in datagrams, and appending source/destination headers for routing said datagrams between said at least one network portal and said plurality of application platforms and said voice/data network irrespective of content of said voice and data encapsulated in said datagrams; wherein said first protocol is implemented within each of said plurality of application platforms by a physical layer for exchanging said voice and data between said plurality of application platforms and said at least one network portal using said datagrams, an application specific interface for formatting said voice and data for use by said application platforms, and a first information encapsulation layer for encapsulating said voice and data into said datagrams, appending said source/destination headers to said datagrams and transmitting said datagrams over said physical layer and for stripping said source/destination headers from said datagrams received from said physical layer and transmitting said voice and data to said application specific interface.

2. The hybrid network configuration of claim 1, wherein said first protocol is implemented within said at least one network portal by said physical layer, a network portal control interface for identifying voice and data in connection with which said network portal is capable of processing directly and alternatively re-transmitting said voice and data, and a second information encapsulation layer for encapsulating said voice and data received from said network portal control interface into said datagrams, appending said source/destination headers to said datagrams and transmitting said datagrams over said physical layer, and for stripping said source/destination headers from said datagrams received from said physical layer and transmitting said voice and data to said network portal control interface.

3. The hybrid network configuration of claim 1, wherein said second protocol is implemented within said voice/data network by a physical layer for exchanging said voice and data between said voice/data network and said at least one network portal using said datagrams, an information routing layer for formatting said voice and data received from said physical layer for transmission across said voice/data network and for appending said source/destination headers to said voice and data and transmitting same over said physical layer.

4. The hybrid network configuration of claim 3, wherein said second protocol is implemented within said at least one network portal by said physical layer and an information encapsulation layer for encapsulating said voice and data into said datagrams, appending said source/destination headers to said datagrams received from said network portal, and transmitting said datagrams over said physical layer, and for stripping said source/destination headers from said datagrams received from said physical layer and transmitting said voice and data to said at least one network portal.

5. The hybrid network according to any one of claim 1, wherein said plurality of application platforms comprise at least one of telephones, cellular phones, wireless communication devices, PDAs, personal computers, terminals, and laptop computers.

6. The hybrid network according to any one of claim 1, wherein said at least one network portal comprises at least one of telephones, cellular phones, wireless communication devices, PDAs, personal computers, terminals, wireless receiver/transmitter base stations, and laptop computers.

7. The hybrid network according to any one of claim 1, wherein said voice/data network comprises at least one of a LAN, WAN, Internet, Intranet, PBX, Centrex, and wireless system.

8. The hybrid network according to any one of claim 1, wherein said physical layer comprises at least one of a wired interface or wireless interface.

9. The hybrid network according to claim 8, wherein said wired interface comprises at least one of a serial interface, parallel interface, USB interface, tip and ring interface.

10. The hybrid network according to claim 8, wherein said wireless interface comprises at least one of an infrared/IrDA interface, radio interface, and cellular interface.

* * * * *